United States Patent [19]

Stevels et al.

[11] 4,157,981
[45] Jun. 12, 1979

[54] METHOD OF PRODUCING A LUMINESCENT ALKALINE EARTH METAL FLUOROHALIDE ACTIVATED BY BIVALENT EUROPIUM

[75] Inventors: Albert L. N. Stevels; Agnes D. M. Schrama-de Pauw, both of Eindhoven, Netherlands; François Pingault, Amiens, France

[73] Assignee: U.S. Philips Corporation, New York, N.Y.

[21] Appl. No.: 893,063

[22] Filed: Apr. 3, 1978

Related U.S. Application Data

[63] Continuation of Ser. No. 763,048, Jan. 27, 1977, abandoned, which is a continuation of Ser. No. 618,214, Sep. 30, 1975, abandoned.

[30] Foreign Application Priority Data

Oct. 1, 1974 [NL] Netherlands .......................... 7412917

[51] Int. Cl.² .............................................. C09K 11/46
[52] U.S. Cl. ............................................ 252/301.4 H
[58] Field of Search ................................. 252/301.4 H

[56] References Cited

U.S. PATENT DOCUMENTS

| 3,988,252 | 10/1976 | Ferretti | 252/301.4 H |
| 4,075,495 | 2/1978 | Stevels et al. | 252/301.4 H X |

FOREIGN PATENT DOCUMENTS

| 896453 | 3/1972 | Canada | 252/301.4 H |
| 7206945 | 11/1973 | Netherlands. | |

Primary Examiner—Jack Cooper
Attorney, Agent, or Firm—Norman N. Spain

[57] ABSTRACT

Method of preparing a luminescent alkaline earth metal fluorohalide activated by $Eu^{2+}$ defined by the formula $Me_{1-p}Eu_pFX$ (Me=Ba, Sr; X=Cl, Br, I; $0.001 \leq p \leq 0.20$). $MeF_2$ is suspended in water after which 1 mole of $MeX_2$ per mole of $MeF_2$ is dissolved in the suspension. The suspension, which may already contain europium, is evaporated to dryness at 50° C. to 250° C. The obtained product is mixed with the additional required amount of europium in the form of a europium halide and then is subjected to at least one temperature treatment at 600° C. to 1000° C. in a weakly reducing atmosphere. The obtained reaction product is subjected, possibly after being ground, to a final heating at 600° C. to 850° C. in an inert or weakly reducing atmosphere.

7 Claims, No Drawings

METHOD OF PRODUCING A LUMINESCENT ALKALINE EARTH METAL FLUOROHALIDE ACTIVATED BY BIVALENT EUROPIUM

This is a continuation of application Ser. No. 763,048, filed Jan. 27, 1977 and now abandoned, said application Ser. No. 763,048 in turn being a continuation of application Ser. No. 618,214 filed Sept. 30, 1975 and now abandoned.

The invention relates to a method of preparing a luminescent alkaline earth metal fluorohalide activated by bivalent europium. The invention further relates to the resulting alkaline earth metal fluorohalide and to an X-ray image intensifier screen provided with a luminescent alkaline earth metal fluorohalid made in such manner.

The said alkaline earth metal fluorohalides may be defined by the general formula MeFX, where Me represents one or more of the alkaline earth metals Ba and Sr, and X represents one or more of the halogens Cl, BR and I. The crystal structure of these materials is known, as the PbFCl structure and has a tetragonal symmetry. It is known from Netherlands patent application No. 7,206,945 that these fluorohalides are highly efficient luminescent materials when activated by bivalent europium. The europium then replaces part of the alkaline earth metal in the fluorohalide base lattice. These known luminescent fluorohalides can be very satisfactorily excited both by ultraviolet radiation and by electrons and X-rays. The spectral distribution of the emitted radiation consists of a narrow band (half-value width approximately 30 nm) with a maximum at approximately 380 nm. For the materials which contain a considerable quantity of iodine the emission maximum is shifted to longer wavelengths. Notably for the fluoroiodide this maximum is found at approximately 410 nm. It was found that in these materials up to 20 mole % of the Ba and Sr represented by Me can be replaced by Ca whilst retaining the crystal structure.

An important use of the known fluorohalides activated by bivalent europium is found in the so-called X-ray image intensifier screens. Such intensifier screens comprise a material which luminesces under X-ray radiation and serve to shorten the exposure time when taking X-ray images on photographic material. In general they take the form of film cassettes which contain a support coated with the luminescent material which is in contact with the photographic film when taking the X-ray image. The known luminescent fluorohalides when excited by X-rays have a very high luminous flux which may be up to five times that of the known calcium tungstate which is frequently used in X-ray image intensifier screens.

The above-mentioned Netherlands patent application No. 7,206,945 describes a method of manufacturing the fluorohalides activated by bivalent europium, starting from a dry mixture of halides (for example alkaline earth metal chloride, alkaline earth metal fluoride and europium fluoride) which by a reaction at a high temperature is converted into the desired fluorohalide. It has also been found possible to start from a mixture of oxides or carbonates of the alkaline earth metals and of europium together with ammonium halides.

A serious disadvantage of the luminescent fluorohalides obtained in the aforedescribed manner is that they have a high persistence level. This means that these substances have a comparatively high-intensity afterglow for a comparatively long time on cessation of the excitation. For these materials the said persistence level may, for example, be 20 to 100 times that of the known calcium tungstate. Persistence of the luminescent material in an intensifier screen is particularly objectionable because for some time after exposure each movement of the screen relative to the photographic film (when opening film cassettes) results in blurred images. An even more serious drawback is that owing to the persistence considerable waiting periods must be observed before a new film can be placed in the cassette.

United Kingdom Patent Specification No. 1,254,271 describes a method of preparing alkaline earth metal fluorohalides in which these materials are obtained by precipitation from solutions. During the precipitation a solution containing alkaline earth metal cations, for example an alkaline earth metal chloride, and a solution containing the fluorine anions, for example hydrogen fluoride, potassium fluoride or ammonium fluoride, are added to the reaction vessel. It has now been found that if alkaline earth metal fluorohalides activated by bivalent europium are prepared by this method, materials are obtained which have a very high afterglow level.

It is an object of the present invention to provide a method of preparing fluorohalides activated by bivalent europium by which materials having a very low afterglow level are obtained.

A method according to the invention of preparing a luminescent alkaline earth metal fluorohalide activated by bivalent europium and defined by the formula $Me_{1-p}Eu_pFX$, where Me represents at least one of the alkaline earth metals Ba and Sr whilst up to 20 mole % of these metals can be replaced by Ca, X represents at least one of the halogens Cl, Br and I and $0.001 \leq p \leq 0.20$, is characterized in that an aqueous suspension of $MeF_2$ is made which contains 1 mole of $MeX_2$ in dissolved form per mole $MeF_2$ and may further contain europium in the form of europium halide in an amount at most equal to the amount desired in the fluorohalide, in that the suspension is evaporated to dryness at a temperature from 50° C. to 250° C., the resulting product is mixed with the amount of europium halide which still may be required, the mixture is subjected to at least one temperature treatment at 600° C. to 1000° C. in a weakly reducing atmosphere and the obtained reaction product, after cooling, is subjected to a final heating at a temperature of 600° C. to 850° C. in an inert or weakly reducing atmosphere.

A method according to the invention starts from an aqueous suspension of $MeF_2$, i.e. a mixture of fine-grained $MeF_2$, which is substantially insoluble in water, and an aqueous dissolving medium. Prior or subsequent to the preparation of this suspension $MeX_2$ is dissolved in the dissolving medium in the stoichiometric amount of 1 mole per mole of the $MeF_2$ used. Small deviations from the stoichiometry are found to be permissible and in general have little effect on the properties of the fluorohalide obtained. When preparing this suspension the required amount of europium can entirely or partly be added either as insoluble $EuF_3$ or as soluble $EuX_3$. The suspension then is evaporated to dryness at a temperature of 50° C. to 250° C. X-ray diffraction analyses show that the obtained product already has the characteristic PbFCl structure, and this product is mixed with the amount of europium which still may be required in the form of europium halide. The mixture is subjected to one or more temperature treatments at 600° C. to 1000° C. in a weakly reducing atmosphere. During this treatment the already incorporated europium is reduced to the bivalent state and/or the admixed europium is incorporated as bivalent europium in the crystal lattice. The resulting reaction product is subjected to a final heating at 600° C. to 850° C. in an inert or weakly reducing atmosphere to improve the crystal structure and to obtain optimum grain size of the powder.

Formation of the fluorohalide compound, incorporation of europium in the desired bivalent state and recrystallization of the obtained pulverulent product take place separately and successively in a method according to the invention. This is highly advantageous, because thus these three steps in the preparation can separately be optimized and a luminescent material having optimum luminescence properties can be obtained. In particular, with respect to the afterglow level it proves to be an essential requirement that the fluorohalide compound is formed at a comparatively low temperature (during evaporation to dryness at 50° C. to 250° C.). It is assumed that under these conditions the incorporation of traces of oxygen which may be the cause of a high afterglow level is avoided as far as possible.

It was found that by means of a method according to the invention a luminescent fluorohalide is obtainable the afterglow level of which has been reduced to an amount about equal to that of the known calcium tungstate. It was further found that, in comparison to the fluorohalide prepared in the known manner, the luminous flux obtained by the said materials when excited by X-rays has the same high value or even a higher value.

Although it is possible to add the desired amount of the europium activator in its entirety to the suspension in the form of $EuX_3$ or $EuF_3$, a method according to the invention is preferred in which the suspension contains no europium at all, p moles of $EuX_3$ being added per mole of the MeFX obtained by evaporation to dryness, for it has been found that the best results are obtained, in particular in respect of the afterglow level, if a europium halide (except the fluoride) is used as the activator compound and if this activator compound is added after the synthesis of the fluorohalide compound.

It was found to be of advantage for the reaction product obtained after the temperature treatment at 600° C. to 1000° C. in a weakly reducing atmosphere to be ground before it is subjected to the final heating, for if the conditions during the temperature treatment are optimized for the incorporation of bivalent europium in many cases a reaction product may be formed which is too coarse-grained for practical uses. Any deleterious effect of the grinding operation on the afterglow level is entirely eliminated by the final heating.

The most important use of the fluorohalides activated by bivalent europium is found, as mentioned hereinbefore, in X-ray image intensifier screens. Advantageously the element Me then is barium because this gives the highest luminous fluxes on excitation by X-rays. For obtaining high luminous fluxes upon X-ray excitation it is also advantageous to use bromine for the element X. It was found, however, that the afterglow level of BaFBr is high compared with that of BaFCl. For example, the BaFBr prepared in known manner has an afterglow level which is up to 100 times that of calcium tungstate. A method according to the invention enables this level to be reduced to a few times that of calcium tungstate. The best combination of a low afterglow level and a high luminous flux is obtained with materials of the formula $Ba_{1-p}Eu_pFCl$. Hence a method according to the invention for preparing such materials is preferred.

In a preferred embodiment of a method according to the invention in which $Ba_{1-p}Eu_pFCl$ is prepared, evaporation to dryness is performed at a temperature of 160° C. to 180° C., for under these conditions the formation of the BaFCl is optimal.

When preparing $Ba_{1-p}Eu_pFCl$ the best results are further obtained if the temperature treatment is effected at a temperature of 800° C. to 950° C. in nitrogen containing from 0.1 to 1 volume percent of hydrogen and if the final treatment is performed at a temperature of 700° C. to 800° C. in nitrogen. Hence these conditions are preferred.

The invention will now be described more fully with reference to a few Examples of preparation.

EXAMPLE 1

An amount of 8.765 g of $BaF_2$ is added to water and suspended by stirring. 12.240 g of $BaCl_2.2H_2O$ are dissolved in this suspension. The suspension then is evaporated to dryness at a temperature of 170° C. The resulting substance consists of BaFCl and, as is shown by X-ray diffraction analyses, has the PbFCl structure. The BaFCl is mixed with 1.374 g of $EuCl_3$ and then heated in a quartz crucible at 900° C. in a furnace in a weakly reducing atmosphere for 1 hour. The said atmosphere is obtained by passing a stream of nitrogen (about 137 l per hour) containing 0.7 volume percent of hydrogen into the furnace. After cooling the resulting product is ground in a ball mill. Then the product is subjected to final heating at 750° C. in a nitrogen stream (about 18 l per hour) for 1 hour. After cooling, the product, which has a composition defined by the formula $Ba_{0.95}Eu_{0.05}FCl$, is ready for use.

In order to compare the luminescence properties on excitation by X-rays of the material obtained according to the above Example of preparation which those of the known $CaWO_4$, screens are manufactured using the said material and identical screens which, however, contain calcium tungstate in the same amounts by weight. A photographic film is brought into contact with these screens. Then the film density rate is measured under standard conditions (primary voltage of the X-ray tube; distance of the X-ray tube from the screen and the film; filters). The fluorohalide prepared by the method according to the invention proves to have a rate which is 7 times that of the known $CaWO_4$. The afterglow level of the fluorohalide also is measured and compared with that of $CaWO_4$. For this purpose the screens are exposed to X-rays for some time (under standard conditions). One minute after cessation of the excitation a photographic film is placed on the screen and held in contact with it for 5 minutes. The film density measured, which is a measure of the afterglow level, proves to be equal for the fluorohalide and for the $CaWO_4$.

EXAMPLE 2

Example 1 is repeated with the difference that the amount of 1.374 g of $EuCl_3$ is added to the suspension and dissolved in it. The product obtained is equal to that of Example 1 and has substantially the same luminescence properties.

EXAMPLE 3

Example 1 is repeated with the difference that the temperature treatment in the weakly reducing atmosphere is performed at 850° C. for 1 hour. The density rate of the obtained material is found to be 6.3 times that of CaWO₄ whilst the afterglow level is found to be about twice that of CaWO₄.

EXAMPLE 4

Example 1 is repeated with the difference that the temperature treatment in the weakly reducing atmosphere is performed at 950° C. for 1 hour. The density rate of the resulting material is 5.2 times that of CaWO₄ and the afterglow level is about equal to that of CaWO₄.

What is claimed is:

1. A method for the preparation of a bivalent europium activated luminescent alkaline earth metal fluorohalide of the formula $Me_{1-p}Eu_pFX$ where Me is at least one alkaline earth metal selected from the group consisting of Ba and Sr, up to 20 mole percent of Me being replaceable by Ca, X is at least one halogen selected from the group consisting of Cl, Br and I and $0.001 \leq p \leq 0.20$, comprising forming an aqueous suspension of $MeF_2$ and an equimolar amount of $MeX_2$ in dissolved form per mole of $MeF_2$, evaporating said suspension to dryness at a temperature of 50° C. to 250° C., mixing the resultant MeFX product with p moles of $EuX_3$ per mole of MeFX product, heating the resultant dried mixture in a weakly reducing atmosphere of nitrogen and a small amount of hydrogen for effectively reducing trivalent europium to bivalent europium, at a temperature of 600° C. to 1000° C., and then, after cooling, heating the resultant bivalent europium activated alkaline earth metal fluorohalide, in an inert atmosphere, at a temperature of 600° C.-850° C.

2. The method of claim 1 wherein the dried mixture is heated at a temperature of 800° to 950° C. in an atmosphere of nitrogen containing 0.1 to 1 volume % of hydrogen.

3. A bivalent europium activated luminescent alkaline earth metal fluorohalide having a substantially reduced afterglow and produced by the method of claim 1.

4. A method as claimed in claim 1 wherein said bivalent europium activated alkaline earth metal fluorohalide is ground prior to said heating in an inert atmosphere.

5. Method as claimed in claim 4, characterized in that a fluorohalide defined by the formula $Ba_{1-p}Eu_pFCl$ is prepared.

6. Method as claimed in claim 5, characterized in that the evaporation to dryness takes place at a temperature of 160° C. to 180° C.

7. The method of claim 1 wherein said heating of the resultant bivalent europium activated alkaline earth metal flurohalide is carried out in nitrogen at a temperature of 700° C. to 800° C.

* * * * *